United States Patent
Matsuda et al.

(10) Patent No.: US 6,513,700 B2
(45) Date of Patent: Feb. 4, 2003

(54) WELDED STRUCTURE AND WELDING METHOD FOR BOSS AND BRACKET

(75) Inventors: Yukinobu Matsuda, Komatsu (JP); Kyuichi Kawashima, Komatsu (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 09/907,950

(22) Filed: Jul. 19, 2001

(65) Prior Publication Data
US 2002/0014517 A1 Feb. 7, 2002

(30) Foreign Application Priority Data
Jul. 28, 2000 (JP) .................... 2000-228160

(51) Int. Cl.$^7$ ............ B23K 31/02; H01F 3/00; B21D 53/88
(52) U.S. Cl. ............. 228/170; 228/173.4; 428/544; 428/596; 29/897.2
(58) Field of Search ............... 228/164, 165, 228/170, 173.4, 174; 428/544, 577, 578, 586, 596; 29/897, 897.2

(56) References Cited

U.S. PATENT DOCUMENTS

| | | | | |
|---|---|---|---|---|
| 3,714,844 A | * | 2/1973 | Tsuda | 280/731 |
| 3,808,875 A | * | 5/1974 | Miller | 73/32 A |
| 4,038,051 A | * | 7/1977 | Ide | 137/204 |
| 4,130,931 A | * | 12/1978 | Norcross | 164/102 |
| 4,281,680 A | * | 8/1981 | Ripert | 137/454.2 |
| 4,351,469 A | * | 9/1982 | Newman | 228/135 |
| 4,790,207 A | * | 12/1988 | Diekman et al. | 403/197 |
| 4,930,817 A | * | 6/1990 | Fuchs | 228/173.4 |
| 5,282,566 A | * | 2/1994 | Lammers et al. | 228/161 |
| 5,470,190 A | * | 11/1995 | Bamford et al. | 414/686 |
| 5,653,048 A | * | 8/1997 | Jones et al. | 37/450 |
| 5,717,545 A | * | 2/1998 | Brooks et al. | 29/523 |
| 6,050,611 A | * | 4/2000 | Asada | 285/133.4 |
| 6,089,617 A | * | 7/2000 | Craig et al. | 219/93 |
| 6,164,521 A | * | 12/2000 | Mellon | 228/123.1 |
| 6,273,632 B1 | * | 8/2001 | Takahashi et al. | 403/14 |
| 2002/0014517 A1 | | 2/2002 | Matsuda et al. | |
| 2002/0053789 A1 | * | 5/2002 | Fujimoto et al. | |

FOREIGN PATENT DOCUMENTS

| | | | |
|---|---|---|---|
| JP | 359153593 A | * | 9/1984 |
| JP | 409125441 A | * | 5/1997 |
| JP | 10266848 A | * | 10/1998 |
| JP | 10266849 A | * | 10/1998 |
| JP | 411326070 A | * | 11/1999 |
| JP | 2002038512 A | * | 2/2002 |

* cited by examiner

Primary Examiner—Tom Dunn
Assistant Examiner—Kiley Stoner
(74) Attorney, Agent, or Firm—Varndell & Varndell, PLLC

(57) ABSTRACT

To provide such a boss welding structure for the arm of a working implement that is light in weight and easy in manufacture. A cylindrical body formed of one sheet metal, there are formed a first hole and a second hole of predetermined shapes. A boss is equipped with a boss seat for covering the first hole, and a bracket is equipped with a bracket seat for covering the second hole. The boss and the bracket are inserted into the cylindrical body and are individually welded on the cylindrical body from the outer side of the cylindrical body such that the first hole is covered from the inner side with the boss seat whereas the second hole is covered with the bracket seat.

6 Claims, 9 Drawing Sheets

WELDED STRUCTURE AND WELDING METHOD FOR BOSS AND BRACKET

BACKGROUND OF THE INVENTION

1. Field of the Invention

The present invention relates to a welded structure for a boss and a bracket to be mounted in a cylindrical structure made of a sheet metal, and a welding method therefor.

2. Related Art

FIG. 9 is a sectional view showing one example of a cylindrical body having a boss in its inside and made of a sheet metal. In a cylindrical body 50 having a rectangular section and constructed of vertically opposed upper and lower sheets 51 and 51 and horizontally opposed side sheets 52 and 52, there are arranged a boss for a mounting pin having a seat 54, and a boss 55 having a seat 56. These seats 54 and 56 are individually deposited on the right and left side sheets 52 and 52 from the inner side of the cylindrical body 50. In the bosses 53 and 55, there are formed pin mounting holes 57 which extend therethrough in the axial directions. Holes are also formed coaxially with the holes 57 and 57 through the side sheets 52 and 52. In this structure, for example, the cylinder rod head 61 of a hydraulic cylinder to be mounted in the cylindrical body 50 is mounted by sandwiching it between the bosses 53 and 55 and by inserting amounting pin 60, as indicated by double-dotted lines in FIG. 9, into the holes 57 and 57 and the mounting hole of the rod head 61.

The cylindrical body 50 is manufactured by depositing the boss 53 and the seat 54, the boss 55 and the seat 56 at first, then the seats 54 and 56 on the right and left side plates 52 and 52, and then the side plates 52 and 52 and the upper and lower sheets 51 and 51, to construct the rectangular cylindrical body 50.

When the welded structure having the construction described above is manufactured, however, the bosses 53 and 55 and the seats 54 and 56 are deposited in advance on the side sheets 52 and 52, and then the side sheets 52 and 52 and the upper and lower sheets 51 and 51 are deposited at the four corners to construct the rectangular cylindrical body 50. This construction raises a problem that the manufacture has many steps and a long welding line and takes a long time and a high cost. Another problem is that the cylindrical body 50 has an increased total weight. Moreover, the numerous sheets are deposited to construct the cylindrical body so that the deposited portions have to be strengthened for enhancing the rigidity of the structure, but this high rigidity is hard to attain.

In recent years, with a view to solving these problems, it has been proposed for the arm of a working implement of a construction machine to form a compact cylindrical body by bending a sheet metal so as to raise the rigidity, to lessen the weight, to improve the field of view and to lower the cost. In this case, various shapes including circular and triangular shapes can be conceived as the sectional shape, which is exemplified by one of a generally triangular cylindrical body 71, as shown in FIG. 10. This cylindrical body 71 is manufactured by a process including the steps of: bending a sheet material 70 upward at first in the vicinity of its two end portions, as indicated by double-dotted lines; next bending the right and left portions upward, as indicated by arrows, on the apex of the triangle into the shape shown by solid lines; and finally depositing the central portion P of the base of the triangle, as located at an upper portion.

In the manufacture case having the aforementioned steps, when the bosses 53 and 55 or the bracket for the mounting pins is deposited in the prepared cylindrical body 71, the outer peripheral portions of the bosses 53 and 55 and the bracket have to be deposited, according to the process of the prior art, on the cylindrical body 71 from the inner side of the cylindrical body 71. In the manual welding case, therefore, the worker is required to perform the welding work by inserting the welding torch into the small-sized cylindrical body 71 while substantially failing to observe the welding line, so that sufficient welding strength and precision cannot be retained. Even with an automatic welding apparatus such as a welding robot, alternatively, it is extremely difficult to move the robot arm or the welding torch in the narrow space of the cylindrical body and to automate the welding work. On the other hand, it is also conceivable to form the cylindrical body 71, after the boss 53 for the mounting pin and the bracket were deposited in advance on a sheet metal, by bending the sheet metal. According to this method, however, there is a problem that the sheet metal cannot be precisely bent because it is blocked by the deposited boss or the like. This problem makes it seriously difficult to practice that method.

From the discussion thus far made, it is an important target to achieve a welding method capable of depositing the boss or the bracket highly precisely and firmly in the cylindrical body formed in advance of the sheet metal.

SUMMARY OF THE INVENTION

Noting the problems thus far described, therefore, the present invention has an object to provide not only such a welded structure for a boss and a bracket in a cylindrical body as can have a light weight, retain a rigidity, an excellent durability and an easy manufacture but also a welding method therefor.

In order to achieve the above-specified object, according to a first invention, in a sheet metal structure including at least one of a boss and a bracket for mounting a member is mounted in a cylindrical body, a welded structure for a boss and a bracket is constructed: by boring holes of predetermined shapes in predetermined portions on the side face of a cylindrical body made of a sheet metal; by inserting seats of at least one of a boss and a bracket from the inner side into said holes; by mounting the member mounting portions of said boss and said bracket in said cylindrical body; and by welding the individual seats of said boss and said bracket on the side face of said cylindrical body from the outer side of said cylindrical body.

According to the first invention, the bores are formed in the side face of the prepared cylindrical body of the sheet metal, and the boss or the bracket and the side face of the cylindrical body are deposited from the outer sides of the holes. Even where the cylindrical body is made compact to fail to retain a space therein for the welding torch or the like to move, the boss or the bracket can be easily and reliably mounted and welded in the cylindrical body. This makes it possible to increase the degree of freedom for designing the sectional shape of the cylindrical body, to provide a light and highly rigid cylindrical body easily, to simplify the structure and to lower the cost.

According to a second invention, there is provided a welding process for a boss and a bracket of a sheet metal structure including at least one of a boss and a bracket for mounting a member is mounted in. a cylindrical body. The welding process comprises:

a) forming a cylindrical body of a thin sheet metal;

b) boring holes of predetermined shapes in predetermined portions on the side face of said cylindrical body;

c) inserting seats of at least one of a boss and a bracket from the inner side into said holes, and mounting the member mounting portions of said boss and said bracket in said cylindrical body; and d) welding the individual seats of said boss and said bracket on the side face of said cylindrical body from the outer side of said cylindrical body.

According to the second invention, the pin mounting portion for the boss or the bracket, as prepared separately in advance, can be mounted in the cylindrical body prepared in advance, and the boss or the bracket can be deposited easily, highly accurately and reliably on the side face of the cylindrical body thereby to improve the welding workability of the boss or the bracket.

According to a third invention, in a working implement for a construction machine including at least one of a boss and a bracket for mounting a drive unit of an arm outside of a cylindrical body and for mounting a drive unit of a working attachment inside of said cylindrical body, a welded structure for a boss and a bracket is constructed: by boring holes of predetermined shapes for releasing the concentration of stress, in predetermined portions on the side face of a cylindrical body made of a sheet metal; by providing at least one of a boss and a bracket for mounting a drive unit of a working attachment, with seats shaped so substantially similar to said holes as to cover said holes; by inserting said seats from the inner side into said holes; by mounting the attaching portion of the drive unit of the working attachment of said boss and said bracket for mounting the drive unit of the working attachment, in said cylindrical body, and covering said holes with said seats; and by welding said seats on the side face of said cylindrical body from the outer side of said cylindrical body.

According to the third invention, the boss or the bracket for mounting the drive unit of the working attachment can be arranged in the cylindrical body of the sheet metal and deposited on the side face of the cylindrical body thereby to increase the degree of freedom for designing the sectional shape of the cylindrical body, to simplify the structure, to lessen the weight, to improve the field of view and to lower the cost. On the other hand, the holes of the deposited portions on the side face of the cylindrical body and the seats for the boss and the bracket are shaped to release the stress concentration, thereby to make it possible to reduce the stress to occur at the deposited portion, to reduce the fear of the breakage of the deposited portion and to improve the durability of the case in which the cylindrical body is applied to the arm of the working implement of the construction machine.

According to a fourth invention, there is provided a welding process for a boss and a bracket of a working implement for a construction machine including at least one of a boss and a bracket for mounting a drive unit of an arm outside of a cylindrical body and for mounting a drive unit of a working attachment inside of said cylindrical body. The welding process comprises:

a) forming a cylindrical body of a thin sheet metal;

b) welding at least one of the boss and the bracket for mounting the drive unit of the arm, on the outer portion of said cylindrical body;

c) boring holes of predetermined shapes for releasing the concentration of stress, in predetermined portions on the side face of said cylindrical body;

d) providing at least one of a boss and a bracket for mounting the drive unit of the working attachment, with seats shaped so substantially similar to said holes as to cover said holes;

e) inserting said seats from the inner side into said holes, mounting the attaching portion of the drive unit of the working attachment of said boss and said bracket for mounting the drive unit of the working attachment, in said cylindrical body, and covering said holes with said seats; and f) welding said seats on the side face of said cylindrical body from the outer side of said cylindrical body.

According to the fourth invention, there is arranged in the cylindrical body prepared of the sheet metal the pin mounting portion of the boss or the bracket for mounting the drive unit of the working attachment, as prepared separately in advance, so that the seat of the boss or the bracket can be deposited highly precisely and firmly on the side face of the cylindrical body. It is, therefore, unnecessary to deposit the boss or the like in advance in the cylindrical body, and especially the bracket can be deposited, after bored in advance with the pin hole, in the cylindrical body. Therefore, the manufacture process for manufacturing the arm of the working implement from the cylindrical body can be simplified to make it possible to facilitate the welding work, to shorten the manufacture time and improve the working efficiency, and to lower the cost. Moreover, the side face of the cylindrical body is bored with the holes having the smooth shape to release the stress concentration, and the shape of the seat is made generally similar to that of the hole thereby to make it hard to cause the stress concentration at a welded portion between the hole and the seat when a load is applied, and possible to improve the durability.

According to a fifth invention, as based on the method of the second or fourth invention, there is provided a welding process which further comprises: working, after the individual seats of said boss and said bracket mounted in said cylindrical body were deposited from the outer side of said cylindrical body, said deposited portions generally flush with the outer side face of said cylindrical body.

According to the fifth invention, no weld bead protrudes from the outer surface of the cylindrical body so that the stress concentration can be reduced at the welded portion. At the same time, the outer surface of the cylindrical body provides a smoothly slidable face so that the present cylindrical body can be applied to the inner arm of the multistage extendible arm.

DESCRIPTION OF THE PREFERRED EMBODIMENTS

The present invention will be described in detail in connection with its embodiments with reference to the accompanying drawings.

Figure 1:
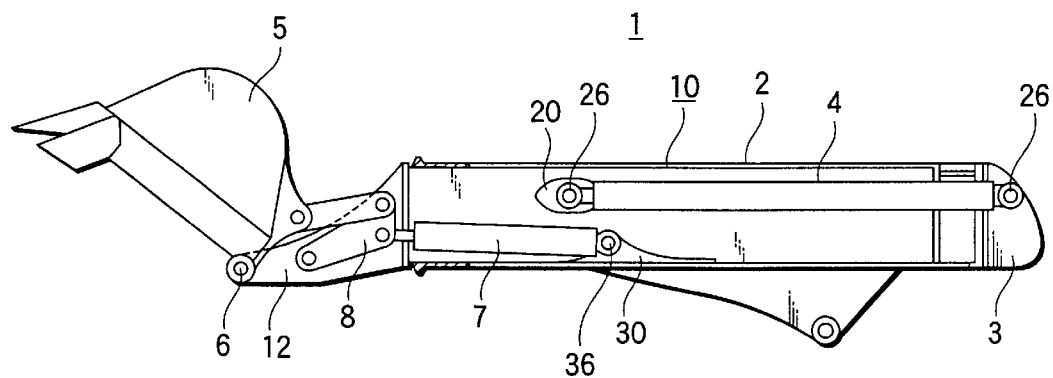
FIG. 1 is a sectional side elevation of a multistage type working arm.

FIG. 1 is a sectional side elevation of an arm 1 of a multistage working implement for a construction machine and shows a welded structure and a welding method of a boss and a bracket of the invention. Into an outer arm 2 formed in a cylindrical shape, as shown in FIG. 1, there is longitudinally slidably inserted an inner arm 10 which is formed in a cylindrical shape. A bracket 3 is fixed to the trailing end portion of the outer arm 2, and a boss 20 for a mounting pin is fixed in the inner arm 10. Between the bracket 3 and the boss 20, there is connected a hydraulic cylinder 4 through first mounting pins 26 and 26. To the leading end portion of the inner arm 10, there is fixed a bracket 12 for a working attachment. To the leading end portion of the bracket 12, there is turnably hinged the working attachment such as a bucket 5 through a bucket mounting pin 6. To the lower portion of the inner side of the inner arm 10, on the other hand, there is fixed a bracket 30 for a mounting pin. To this bracket 30, there is turnably hinged one end portion of a bucket cylinder 7 through a second mounting pin 36. This bucket cylinder 7 is connected at its other end portion to the bucket 5 through a link unit 8.

As the hydraulic cylinder 4 is extended/shrunken, the inner arm 10 slides in the outer arm 2 so that the working arm 1 extends/shrinks. When the bucket cylinder 7 is extended/shrunken, the bucket 5 turns on the bucket mounting pin 6. Therefore, external forces are applied in the arm longitudinal directions to the boss 20 and the bracket 30.

Figure 2:
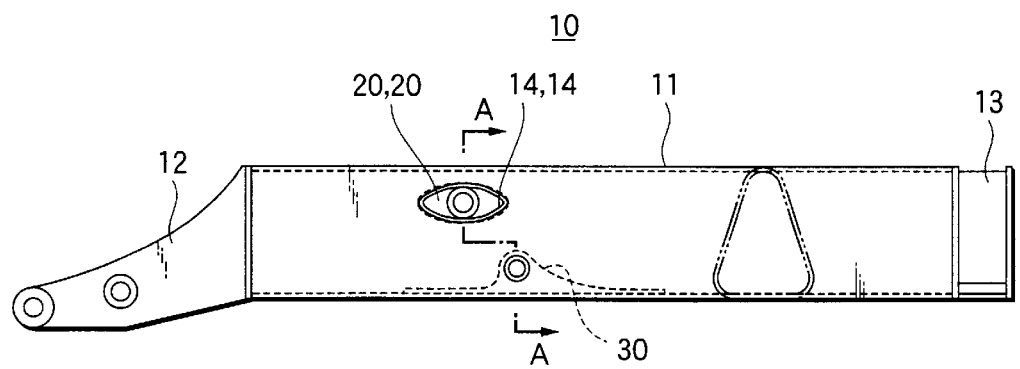
FIG. 2 is a side elevation of an inner arm, to which a welded structure of a boss according to a first embodiment of the invention is applied.
Figure 3:
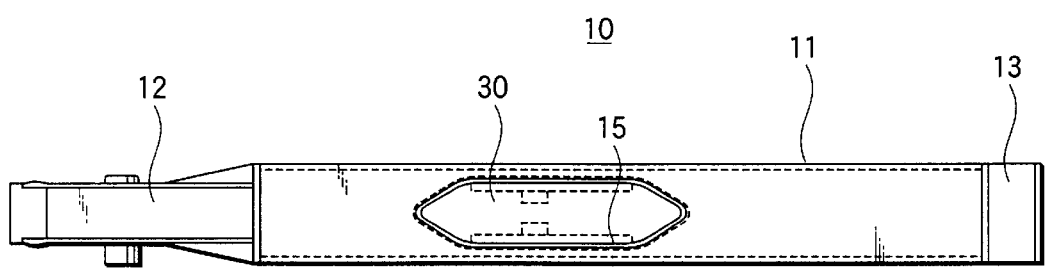
FIG. 3 is a bottom view of the inner arm, to which the welded structure of the boss according to the first embodiment of the invention is applied.

FIG. 2 is a side elevation of the inner arm 10, to which the welded structure and the method of the boss of the first embodiment are applied, and FIG. 3 is a bottom view of the same. As indicated by double-dotted lines in FIG. 2, a cylindrical body 11 of the inner arm 10 is formed of one sheet metal to have a generally triangular shape in section. The bracket 12 for the working attachment is fixed to the leading end portion of the cylindrical body 11, the trailing end portion of which is equipped with a pad mounting portion 13. In the individual right and left side face portions of the cylindrical body 11, there are formed first holes 14 and 14 which are formed into a generally elliptic shape elongated in the longitudinal external force directions and which are smoothed to release the concentration of stress. The bosses 20 and 20 are deposited in these first holes 14 and 14. In the lower face portion of the cylindrical body 11, as shown in FIGS. 2 and 3, there is formed a second hole 15 which is also formed into a generally elliptic shape elongated in the longitudinal external force directions and which are smoothed to release the stress concentration. The bracket 30 is deposited in this second hole 15.

Figure 4:
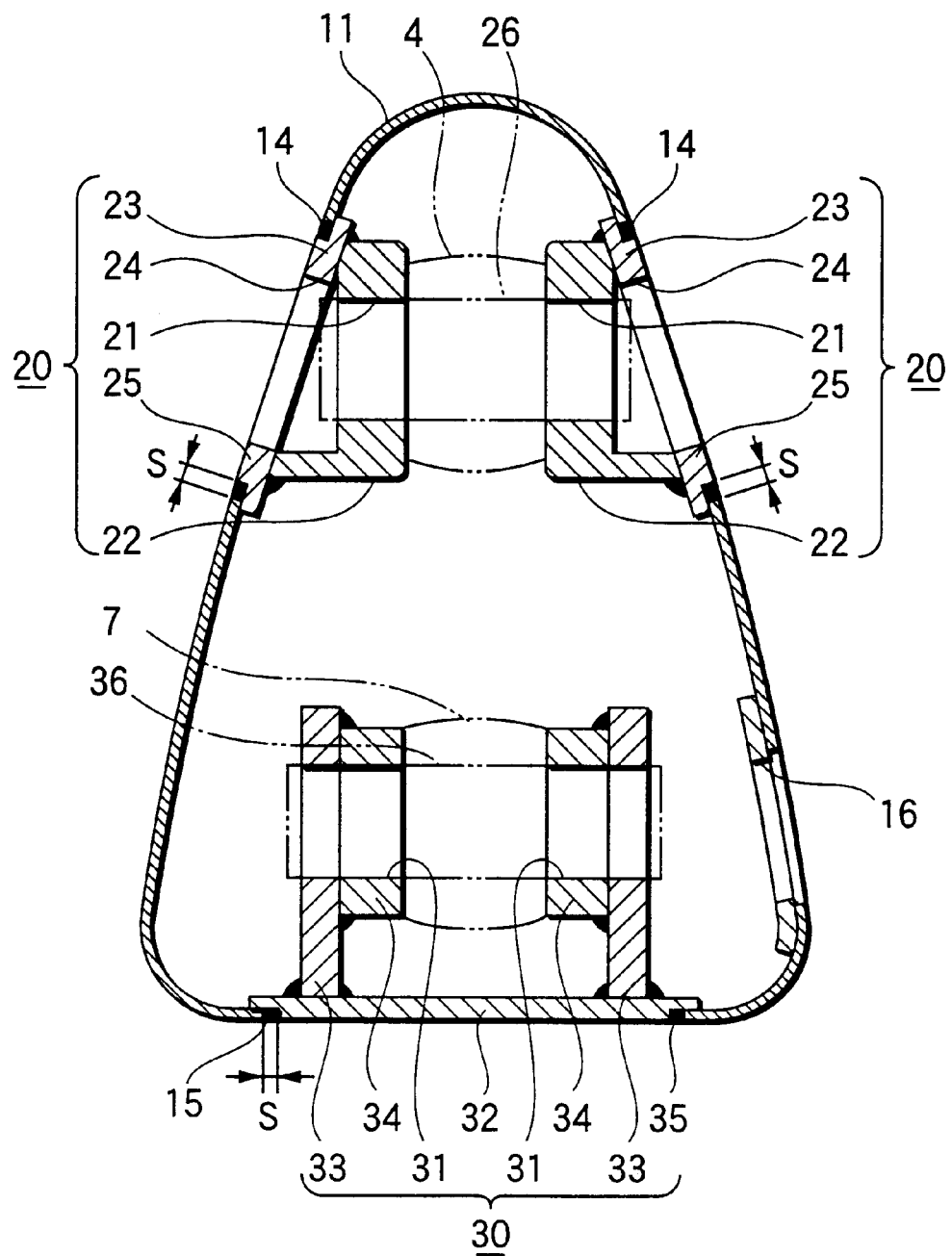
FIG. 4 is a sectional view taken along line A—A of FIG. 2.

FIG. 4 is a view taken along line A—A of FIG. 2.

To a first pin boss 22 having a first pin hole 21, as shown in FIG. 4, there is fixed a boss seat 23 which has a hole 24, thereby to construct the boss 20. As shown in FIGS. 2 and 4, the boss seat 23 is formed along the shape of the first hole 14 into a shape to cover the first hole 14 from the inner side. On the other hand, the boss seat 23 is equipped on its outer surface with a first stepped portion 25 which is formed along the first hole 14 and at a predetermined spacing S from the first hole 14. The first stepped portion 25 is made generally flush with the outer surface of the cylindrical body 11. The boss 20 is inserted, with the first pin boss 22 or the pin mounting portion being located on the inner side, at its first stepped portion 25 into the first hole 14 from the inner side of the cylindrical body 11, and is deposited at the portion of the spacing S. Into the first pin hole 21, there is fitted the first mounting pin 26, as indicated by double-dotted lines, to mount the hydraulic cylinder 4.

In FIGS. 2, 3 and 4, the bracket 30 is constructed to include: a bracket seat 32; a pair of support plates 33 and 33 opposed to each other and fixed on the upper face of the bracket seat 32; and a pair of pin bosses 34 and 34 fixed on the opposed faces of the paired support plates 33 and 33. In the second pin bosses 34, there is formed a second pin hole 31 which extends through the cylindrical body 11 in the transverse directions perpendicular to the longitudinal directions. The bracket seat 32 is formed, as shown in FIGS. 3 and 4, in a shape generally similar to that of the second hole 15 and in a little larger size to cover the second hole 15. The bracket seat 32 is equipped on its outer face with a second stepped portion 35 which is formed along the second hole 15 and at the predetermined spacing S from the second hole 15. The second stepped portion 35 is made generally flush with the outer face of the cylindrical body 11. The bracket 30 is inserted, with the second pin bosses 34 and 34 or the pin mounting portions being located on the inner side, at its second stepped portion 35 into the second hole 15 from the inner side of the cylindrical body 11, and is deposited at the portion of the spacing S. In one side face of the cylindrical body 11, on the other hand, there is formed a pin insertion hole 16 for inserting the second mounting pin 36 into the second pin hole 31. Into the second pin hole 31, there is fitted the second mounting pin 36, as indicated by double-dotted lines, to mount one end portion of the bucket cylinder 7.

Figure 5:
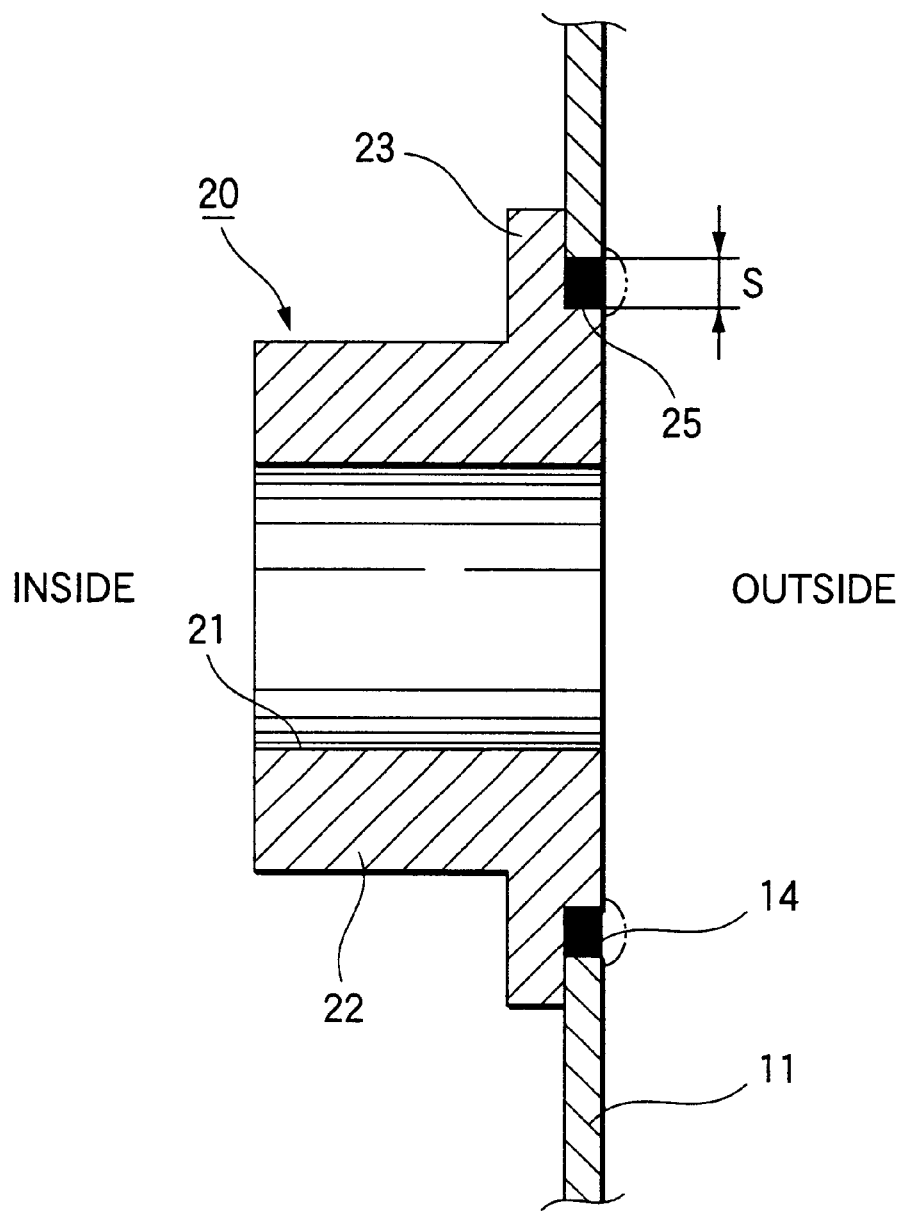
FIG. 5 is a sectional view of a welded portion of the boss according to the first embodiment of the invention.
Figure 10:
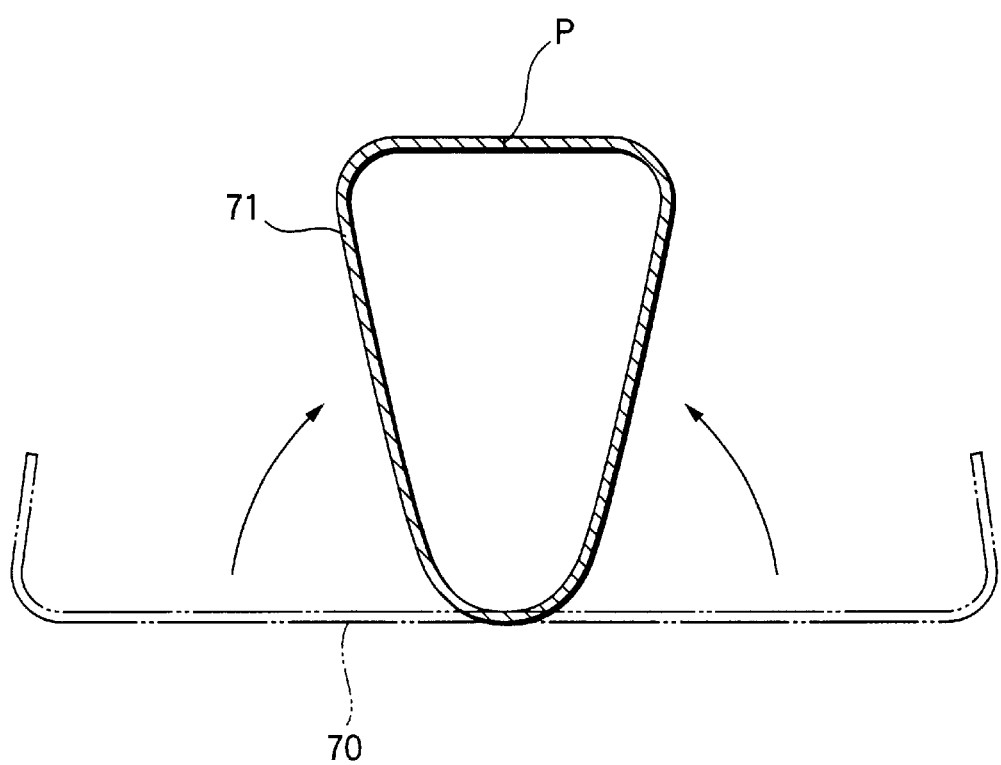
FIG. 10 is a diagram for explaining a method for shaping a cylindrical body having a triangular section and made of a single sheet.

Here will be described a process for manufacturing the inner arm 10.

a) One sheet metal is bent and is deposited at its two end portions (i.e., at the bottom side portions of the generally triangular cylindrical body), as has been described with reference to FIG. 10, to prepare the cylindrical body 11.

b) The working attachment bracket 12 is deposited on the leading end portion of the cylindrical body 11, and the pad mounting portion 13 is deposited on the trailing end portion of the cylindrical body 11.

c) The paired first holes 14 and 14 and the second hole 15 are bored in the cylindrical body 11.

d) Separately, the boss 20 and the bracket 30 are prepared. At this time, not the first pin hole 21 of the boss 20 but the second pin hole 31 of the bracket 30 is bored.

e) The boss 20 is inserted into the cylindrical body 11, and the first stepped portion 25 of the boss 20 is loosely fitted in the first hole 14 to cover this first hole 14 with the boss seat 23. These boss seat 23 and the first hole 14 are deposited from the outer side of the cylindrical body 11. FIG. 5 is a detailed sectional view of the deposited portions of the boss 20 on the cylindrical body 11. The portion of the spacing S between the first hole 14 and the first stepped portion 25 is deposited, and the protruding beads, as indicated by broken lines, are ground to become generally flush with the outer surface of the cylindrical body 11 so that the inner arm 10 can slide smoothly in the outer arm 2.

f) Next, the bracket 30 is inserted into the cylindrical body 11, and the second stepped portion 35 of the bracket 30 is loosely fitted in the second hole 15 to cover this second hole 15 with the bracket seat 32. The portion of the spacing S between the second hole 15 and the second stepped portion 35 is deposited from the outer side of the cylindrical body 11. The protruding beads, as formed at the depositing time, are ground as at the depositing time of the boss 20 to become generally flush with the outer surface of the cylindrical body ii.

g) The first pin holes 21 and 21 are bored to extend transversely in the right and left bosses 20 and 20.

According to the construction and method thus far described, the present invention can achieve the following effects.

1) After the cylindrical body was formed by bending one sheet metal in advance, the bosses and the bracket can be deposited in the cylindrical body. Therefore, the cylindrical body such as the arm or beam of a construction machine can be constructed by working the sheet metal. It is, therefore, possible to provide a light and highly rigid cylindrical body, to improve the balance of the machine and to lessen the portions to be welded, thereby to lower the cost and reduce the time for the manufacture. With the generally triangular sectional shape, on the other hand, it is also possible to improve the front field of view of the working machine.

2) The first hole 14 and the boss seat 23, and the second hole 15 and the bracket seat 32 are so individually elongated in the longitudinal directions for the external forces that they are formed into the smooth shapes to release the stress concentrations, as might otherwise occur at the deposited portions when a load is applied to the cylindrical body, thereby to reduce the fear of breakage and to improve the durability.

3) After the cylindrical body was constructed in advance, the bosses and the bracket, as having been separately prepared in advance, are mounted and deposited in the cylindrical body from the outer side of the cylindrical body. Therefore, the working steps can be reduced, as compared with the method of the prior art, to improve the efficiency and to lower the cost.

4) The pin mounting holes of the bracket 30, as worked in advance, can be deposited to facilitate their works and to lower the cost.

Here, this embodiment has been described by way of example of the working implement arm for the construction machine but could also be applied to another cylindrical sheet metal structure. On the other hand, the cylindrical body has been described by way of example having the triangular section. However, the cylindrical body should not be limited thereto but may be one having another sectional shape such as a polygonal or circular shape.

Figure 6:
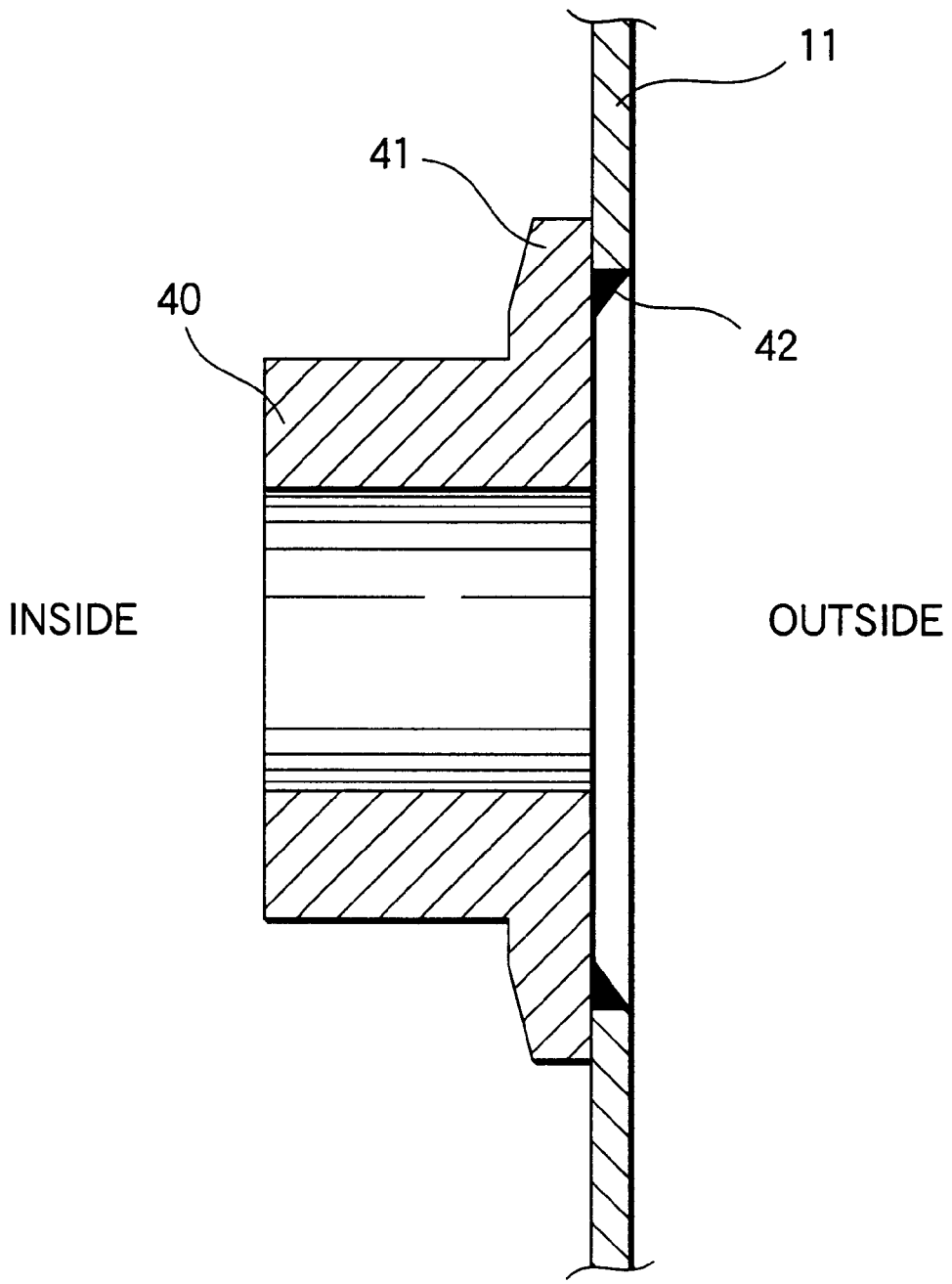
FIG. 6 is a sectional view of a welded portion of a boss according to a second embodiment of the invention.

Here will be described a second embodiment with reference to FIG. 6. FIG. 6 is a sectional view showing the welded structure of a boss of this embodiment. In FIG. 6, a boss 40 is equipped with a seat 41 which is shaped to cover a hole 42 formed in the cylindrical body 11. The hole 42 is covered from the inner side of the cylindrical body 11 with the seat 41, and these seat 41 and hole 42 are fillet-welded from the outer side of the cylindrical body 11.

As a result, like the foregoing embodiment, the boss 40 and so on are disposed in the cylindrical body 11, and the boss 40 and the hole 42 of the cylindrical body 11 can be deposited precisely and reliably from the outer side so that the welding quality can be retained.

Figure 7:
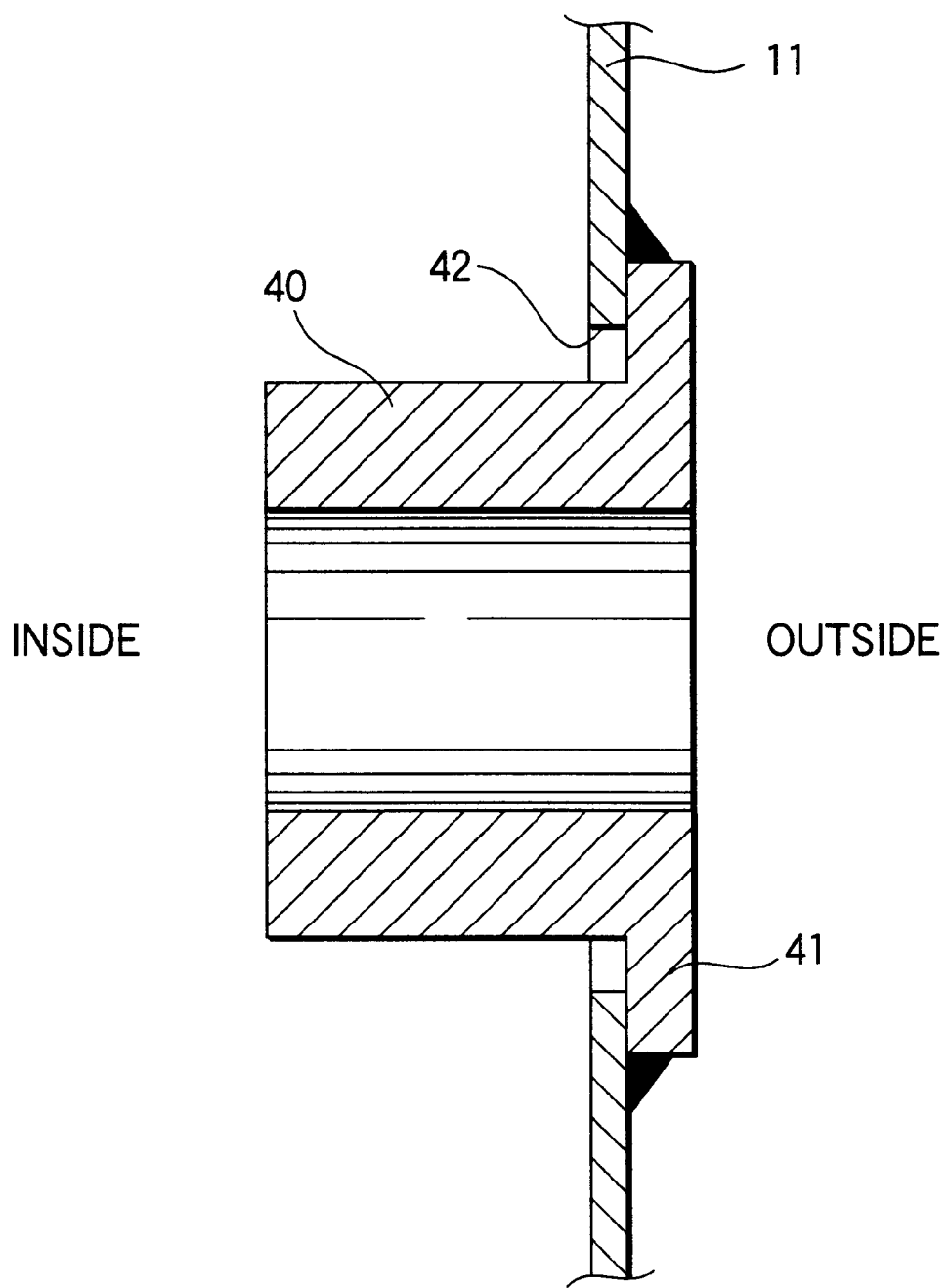
FIG. 7 is a sectional view of a welded portion of a boss according to a third embodiment of the invention.

FIG. 7 is a sectional view showing the welded structure of a boss of a third embodiment. In FIG. 7, a boss 40 is equipped with a seat 41 which is shaped to cover a hole 42 formed in the cylindrical body 11. The boss is inserted into the hole 42 of the cylindrical body 11 from the outer side of the cylindrical body 11, and the hole 42 is covered with the seat 41. Next, this seat 41 is fillet-welded at its outer peripheral portion on the cylindrical body 11 from the outer side. This welding method is applied to the case in which the seat 41 may protrude to the outer side of the cylindrical body 11 and is advantageous in that the depositing work is simple.

Figure 8:
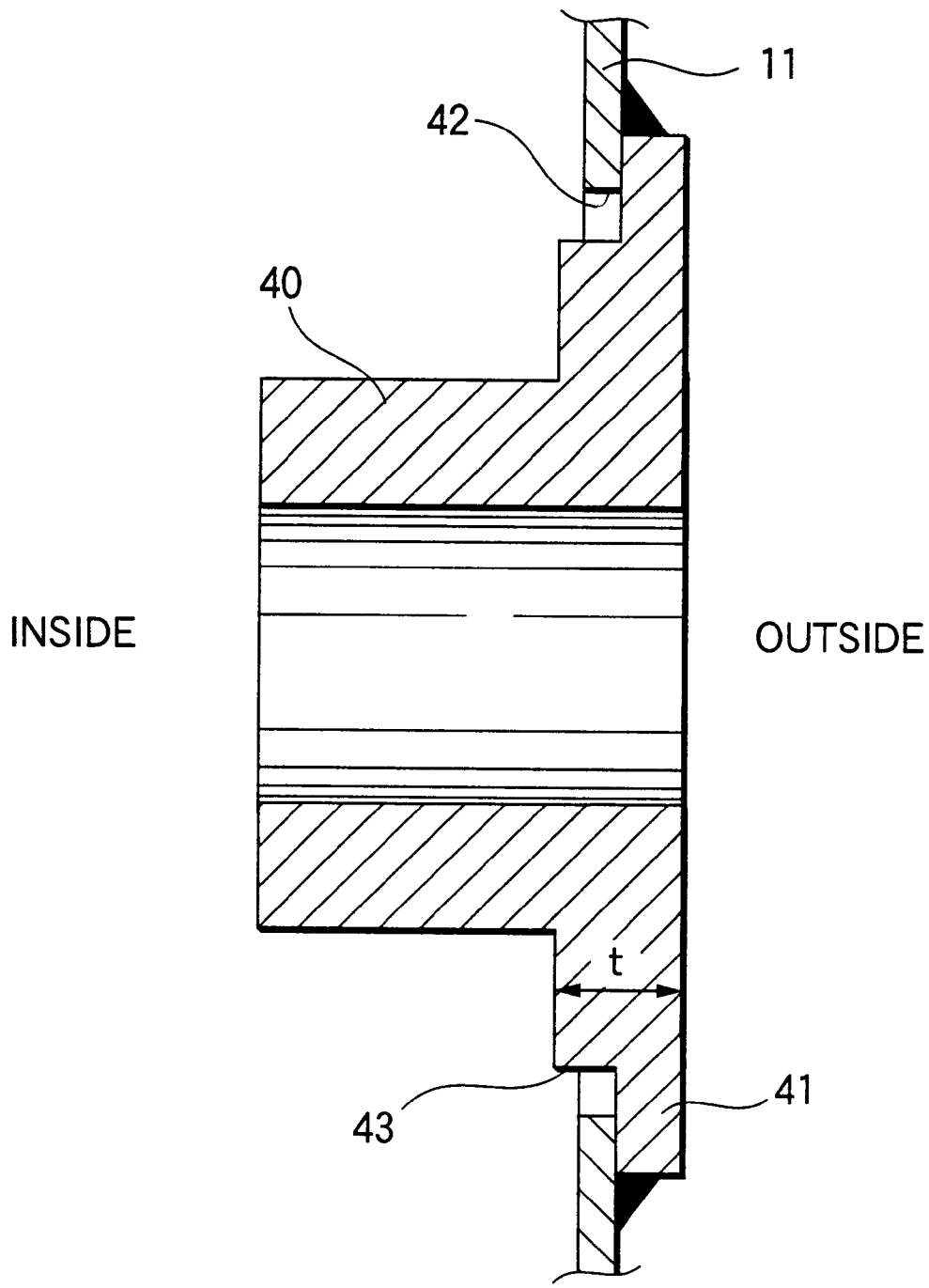
FIG. 8 is a sectional view of a welded portion of a boss according to a fourth embodiment of the invention.
Figure 9:
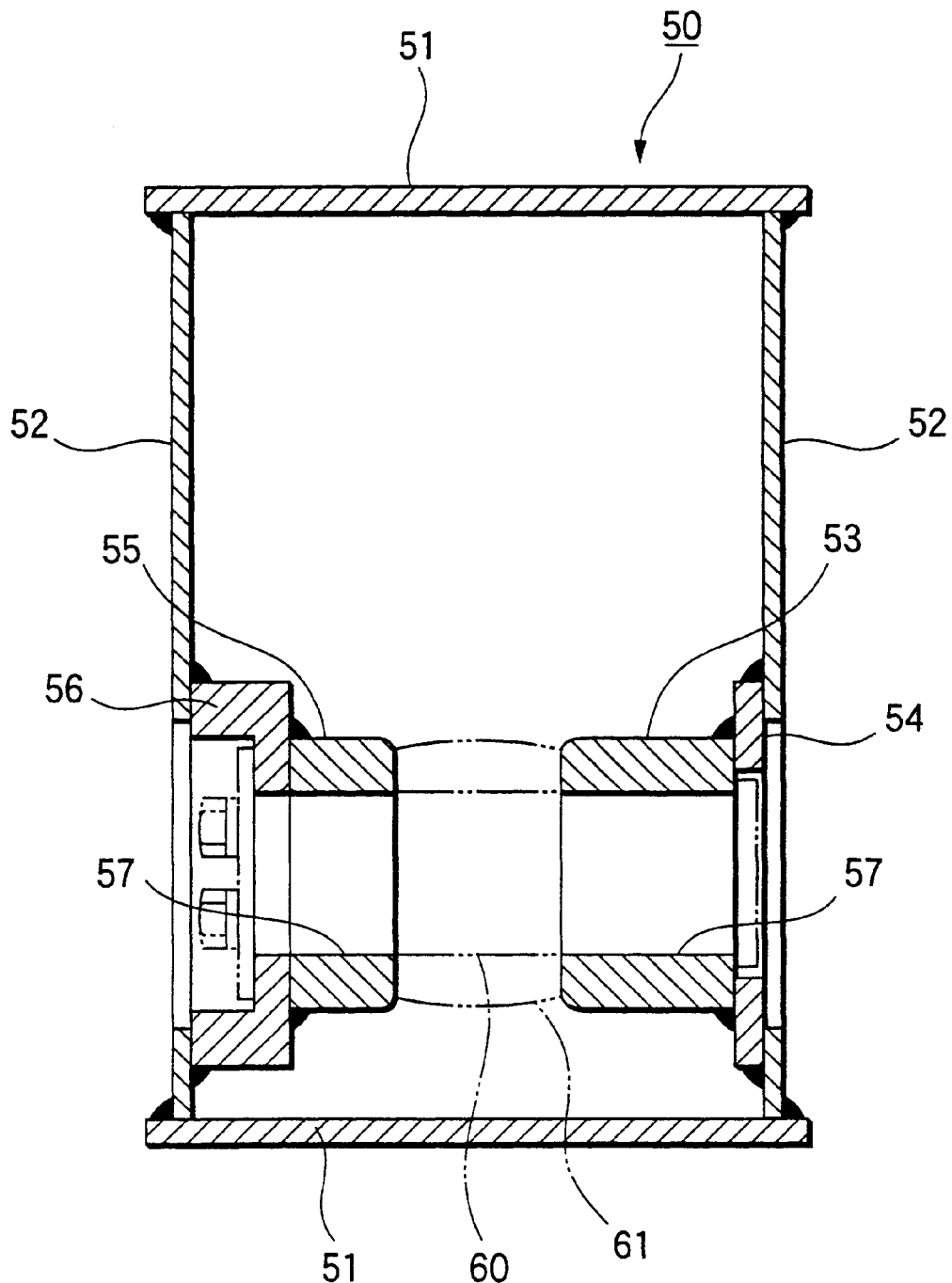
FIG. 9 is a sectional view of a cylindrical body and shows the welded structure of the boss of the prior art.

On the other hand, FIG. 8 is a sectional view showing the welded structure of a boss of a fourth embodiment. In FIG. 8, the boss 40 is equipped with a seat 41 having a stepped portion 43. In the cylindrical body 11, there is formed a hole 42 which is made so large as to insert the stepped portion 43. The seat 41 is shaped to cover the hole 42. The stepped portion 43 is inserted into the hole 42 from the outer side of the cylindrical body 11, and the hole 42 is covered with the seat 41. This seat 41 is fillet-welded at its outer peripheral portion to the outer surface of the cylindrical body 11 from the outer side. The stress concentration can be reduced by setting the stepped portion 43 to a predetermined thickness t.

According to the invention, as has been described hereinbefore, the cylindrical body is bored in its side face with the hole which is shaped to release the stress concentration, and the boss and the bracket are given the seats which are shaped so generally similar to the hole shape as to cover the hole. Therefore, the seats of the boss and the bracket and the side face of the cylindrical body can be deposited from the outer side of the cylindrical body. Even in the case of a compact cylindrical body, therefore, the boss and the bracket can be easily but reliably deposited and mounted. On the other hand, the stress concentration at the deposited portion can be eliminated to improve the durability even if a load is applied to the boss and the bracket. Thus, the boss and the bracket can be mounted in and deposited on the cylindrical body made of one sheet metal thereby to reduce the weight, raise the rigidity and lower the manufacture cost.

What is claimed is:

1. A sheet metal structure including at least one of a boss and a bracket for mounting a member that is to be mounted in a cylindrical body, a welded structure for a boss and a bracket characterized by boring holes of predetermined shapes in predetermined portions on the side face of a cylindrical body made of a sheet metal; by inserting seats of at least one of a boss and a bracket from the inner side into said holes; by mounting member mounting portions of said boss and said bracket in said cylindrical body; and by welding the individual seats of said boss and said bracket on the side face of said cylindrical body from the outer side of said cylindrical body.

2. A working implement for a construction machine including at least one of a boss and a bracket for mounting a drive unit of an arm outside of a cylindrical body and for mounting a drive unit of a working attachment inside of said cylindrical body, a welded structure for a boss and a bracket characterized by boring holes of predetermined shapes for releasing a concentration of stress, in predetermined portions on the side face of a cylindrical body made of a sheet metal; by providing at least one of a boss and a bracket for mounting a drive unit of a working attachment, with seats shaped so substantially similar to said holes as to cover said holes; by inserting said seats from the inner side into said holes; by mounting an attaching portion of the drive unit of the working attachment of said boss and said bracket for mounting the drive unit of the working attachment, in said cylindrical body, and covering said holes with said seats; and by welding said seats on the side face of said cylindrical body from the outer side of said cylindrical body.

3. A welding process for a boss and a bracket of a sheet metal structure including at least one of a boss and a bracket for mounting a member that is to be mounted in a cylindrical body, characterized by comprising:

a) forming a cylindrical body of a thin sheet metal;

b) boring holes of predetermined shapes in predetermined portions on the side face of said cylindrical body;

c) inserting seats of at least one of a boss and a bracket from the inner side into said holes, and mounting member mounting portions of said boss and said bracket in said cylindrical body; and d) welding the individual seats of said boss and said bracket on the side face of said cylindrical body from the outer side of said cylindrical body.

4. A welding process for a boss and a bracket according to claim 3, characterized by further comprising:

working, after the individual seats of said boss and said bracket mounted in said cylindrical body were welded from the outer side of said cylindrical body, so that deposited portions are generally flush with the outer side face of said cylindrical body.

5. A welding process for a boss and a bracket of a working implement for a construction machine including at least one of a boss and a bracket for mounting a drive unit of an arm outside of a cylindrical body and for mounting a drive unit of a working attachment inside of said cylindrical body, characterized by comprising:

a) forming a cylindrical body of a thin sheet metal;

b) welding at least one of the boss and the bracket for mounting the drive unit of the arm, on the outer portion of said cylindrical body;

c) boring holes of predetermined shapes for releasing a concentration of stress, in predetermined portions on the side face of said cylindrical body;

d) providing at least one of a boss and a bracket for mounting the drive unit of the working attachment, with seats shaped so substantially similar to said holes as to cover said holes;

e) inserting said seats from the inner side into said holes, mounting an attaching portion of the drive unit of the working attachment of said boss and said bracket for mounting the drive unit of the working attachment, in said cylindrical body, and covering said holes with said seats; and f) welding said seats on the side face of said cylindrical body from the outer side of said cylindrical body.

6. A welding process for a boss and a bracket according to claim 5, characterized by further comprising:

working, after the individual seats of said boss and said bracket mounted in said cylindrical body were welded from the outer side of said cylindrical body, so that deposited portions are generally flush with the outer side face of said cylindrical body.

* * * * *